US012782133B1

(12) United States Patent
Cingoz et al.

(10) Patent No.: US 12,782,133 B1
(45) Date of Patent: Nov. 3, 2026

(54) PHOTONIC CHIP WITH BEAM SHAPING AND STEERING FOR ATOMIC SENSORS

(71) Applicant: Vector Atomic, Inc., Pleasanton, CA (US)

(72) Inventors: Arman Cingoz, Pleasanton, CA (US); Matthew Todd Cashen, Pleasanton, CA (US); Christopher Scott Corder, Berkeley, CA (US); Junichiro Fujita, Los Altos, CA (US); Abijith Sudarsan Kowligy, Livermore, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 0 days.

(21) Appl. No.: 19/243,404

(22) Filed: Jun. 19, 2025

(51) Int. Cl.
*G01C 19/72* (2006.01)
*G21K 1/00* (2026.01)

(52) U.S. Cl.
CPC ............. *G01C 19/721* (2013.01); *G21K 1/00* (2013.01)

(58) Field of Classification Search
CPC ....... G01C 19/721; G01C 19/722; G21K 1/00
See application file for complete search history.

(56) References Cited

U.S. PATENT DOCUMENTS

| | | | | |
|---|---|---|---|---|
| 7,826,702 | B2 * | 11/2010 | Dawes | G02B 6/132 385/129 |
| 9,819,439 | B2 * | 11/2017 | Ryf | G02B 6/0288 |
| 10,107,936 | B2 * | 10/2018 | Compton | G01P 15/093 |
| 10,630,040 | B2 * | 4/2020 | Jollivet | G02B 6/14 |
| 11,163,116 | B2 * | 11/2021 | Lopez | G02B 6/12004 |
| 11,205,524 | B2 * | 12/2021 | Raman | G21K 1/025 |
| 11,867,852 | B1 * | 1/2024 | Cashen | G01C 19/58 |
| 12,146,996 | B2 * | 11/2024 | McBride | G01R 29/0885 |
| 12,188,969 | B2 * | 1/2025 | Aksyuk | G01R 29/0878 |
| 12,228,650 | B2 * | 2/2025 | LaChapelle | B60W 60/001 |
| 12,276,503 | B2 * | 4/2025 | Kasevich | G01C 19/64 |
| 12,282,242 | B2 * | 4/2025 | Christen | G06N 10/40 |
| 12,416,525 | B2 * | 9/2025 | Boyd | G01J 3/0205 |
| 12,498,523 | B2 * | 12/2025 | Dezfouli | G02B 6/125 |
| 2009/0290837 | A1 * | 11/2009 | Chen | G02B 6/305 385/37 |
| 2015/0117813 | A1 * | 4/2015 | Bai | G02B 6/1228 385/24 |
| 2017/0299900 | A1 * | 10/2017 | Montoya | G02F 1/0121 |
| 2020/0256677 | A1 * | 8/2020 | Kozuma | G01C 19/58 |
| 2020/0287650 | A1 * | 9/2020 | Stern | H04J 14/04 |

(Continued)

OTHER PUBLICATIONS

Sotirova, Ana S., et al. “Low cross-talk optical addressing of trapped-ion qubits using a novel integrated photonic chip.” Light: Science & Applications 13.1 (2024): 199.*

(Continued)

*Primary Examiner* — Wyatt A Stoffa
(74) *Attorney, Agent, or Firm* — Patterson + Sheridan, LLP

(57) ABSTRACT

Embodiments herein describe an atomic sensor that includes a photonic die that outputs optical signals using an integrated beam shaper. These optical signals can be directed as needed to satisfy a particular type of atomic sensor by a photonic chip. The beam shapers can be, for example, static beam shapers (e.g., adiabatic tapers) or adjustable/dynamic beam shapers (e.g., optical phased arrays (OPAs)). The beam shapers can output optical signals with a desired beam pattern (e.g., ellipses with narrow widths and an extended vertical axis).

16 Claims, 9 Drawing Sheets

(56) References Cited

U.S. PATENT DOCUMENTS

| | | | | |
|---|---|---|---|---|
| 2022/0065999 | A1* | 3/2022 | Phare | G01S 7/4818 |
| 2023/0072926 | A1* | 3/2023 | Morrison | G02B 6/4202 |
| 2023/0358964 | A1* | 11/2023 | Dezfouli | G02B 6/125 |
| 2024/0094613 | A1* | 3/2024 | Dülk | G02B 27/0961 |
| 2024/0403677 | A1* | 12/2024 | Eichenfield | H10N 30/20 |
| 2025/0067927 | A1* | 2/2025 | Wu | G02B 6/30 |
| 2025/0067928 | A1* | 2/2025 | Wu | C23C 16/24 |
| 2025/0284129 | A1* | 9/2025 | Sacher | G02B 27/0172 |
| 2026/0079297 | A1* | 3/2026 | Blumenthal | G02B 6/124 |
| 2026/0086418 | A1* | 3/2026 | Dong | G02F 1/2955 |
| 2026/0095026 | A1* | 4/2026 | Su | H01S 5/026 |

OTHER PUBLICATIONS

Girijavallabhan Menon, Shankar. "Combining Nanophotonic Cavity-Arrays with Atomic Arrays: Scaling Quantum Computers and Networks."*

Guo et al., "Integrated Optical Phased Arrays for Beam Forming and Steering", Applied Sciences, vol. 11, No. 9, Apr. 28, 2021, pp. 1-41.

Gustavson T. L., "Precision Rotation Sensing Using Atom Interferometry", PhD thesis Stanford University, URL: <https://web.stanford.edu/group/kasevich/cgi-bin/wordpress/wp-content/uploads/2012/09/GustavsonThesis.pdf>, pp. 1-181, Feb. 2000.

Isichenko et al., "Cooling rubidium atoms with a photonic integrated 3D magneto-optical trap", Optical Sensors and Sensing Congress, 2 pages, 2022.

* cited by examiner

PHOTONIC CHIP WITH BEAM SHAPING AND STEERING FOR ATOMIC SENSORS

STATEMENT OF GOVERNMENT INTEREST

This invention was made with government support under Contract No: N00014-18-C-1052 awarded by the Office of Naval Research. The government has certain rights in the invention.

BACKGROUND

Field

Embodiments of the present invention generally relate to forming an atomic sensor using a photonic die.

Description of the Related Art

Atomic sensors are cutting-edge devices that harness the principles of atomic physics to detect and measure various physical and chemical quantities with high precision. These sensors rely on the behavior and properties of atoms or molecules, such as their energy levels, quantum states, and interactions with external fields. By manipulating and probing atoms, atomic sensors can achieve greater levels of sensitivity and accuracy than other sensors.

Atomic sensors can be used in a wide range of applications. For instance, atomic clocks, which are highly accurate timekeeping devices based on the vibrations of atoms, are used in global navigation systems, telecommunications, and scientific research. Atomic magnetometers, which exploit the behavior of atomic spins in the presence of magnetic fields, are utilized in geophysical surveys, medical imaging, and defense applications. Additionally, atomic sensors find applications in areas such as gravimeters, accelerometers, gyroscopes, and trace gas detection. However, current atomic sensors can be large, are typically difficult to assemble, and rely on bulky optical components.

SUMMARY

One embodiment described herein is an atomic sensor that includes one or more atomic sources configured to emit a directed atomic beam along an path in the atomic sensor and one or more photonic dies including a plurality of beam shapers disposed within the photonic die where the plurality of beam shapers is configured to emit a plurality of optical signals with desired beam aspect ratios and divergences that pass through the path.

One embodiment described herein is a photonic die that includes a plurality of beam shapers disposed within the photonic die where the plurality of beam shapers is configured to emit a plurality of optical signals with elliptical beam patterns that pass through an atom path when disposed in an atomic sensor.

One embodiment described herein is an atomic sensor that includes one or more atomic sources configured to emit a directed atomic beam along an path in the atomic sensor, a first photonic die configured to emit a first plurality of optical signals that pass through the path, and a second photonic die configured to emit a second plurality of optical signals that pass through the path. The first plurality of optical signals is received at the second photonic die and the second plurality of optical signals is received at the first photonic die.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe an atomic sensor that includes a photonic die that outputs optical signals using an integrated beam shaper. These optical signals can be directed as needed to satisfy a particular type of atomic sensor by a photonic chip. As a result, the use of bulk optics can be reduced or eliminated, which can reduce the size of the sensors and the complexity of the assembly process. For example, rather than a technician having to adjust bulk optics to direct optical signals in a particular direction, or parallelize optical signals, a lithography process can be used when forming the photonic die to ensure the optical signals propagate in the desired directions.

The beam shapers can be static beam shapers (e.g., adiabatic tapers) or adjustable/dynamic beam shapers (e.g., optical phased arrays (OPAs)). The beam shapers output optical signals with a desired beam aspect ratios and divergences (e.g., ellipses with narrow widths and an extended vertical axis). For example, elliptical beams permit an atomic sensor to generate measurements from a larger number of atoms that have a range of different velocities. Typically, this would require one or more cylindrical lenses to form the desired beam aspect ratios and divergences. Because integrated beam shapers are used, these lenses can be omitted, which can reduce the size of the atomic sensor. In one embodiment, the beam shapers are disposed at an edge of the photonic chip, but in other embodiments the beam shapers may be disposed at a top surface of the photonic chip.

Figure 1:
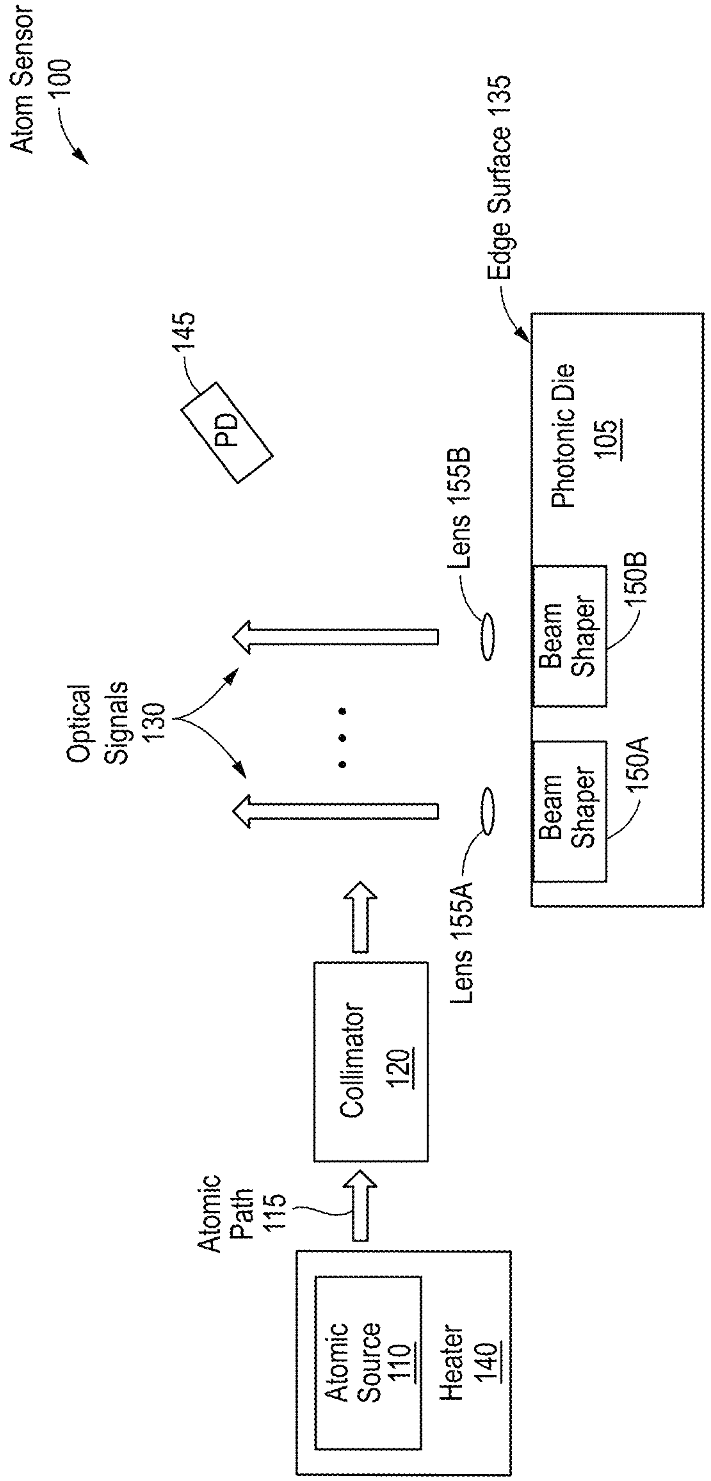
FIG. 1 illustrates an atomic sensor with a photonic die for outputting light at an edge surface, according to one embodiment described herein.

FIG. 1 illustrates an atomic sensor 100 with a photonic die 105 for outputting light at an edge surface 135, according to one embodiment described herein. As shown by this top view, the photonic die 105 (also referred to as a photonic integrated circuit (PIC) or photonic chip) includes a plurality of beam shapers 150 that emit optical signals 130 from the edge surface 135. The beam shapers 150 can be static beam shapers (e.g., adiabatic tapers) or adjustable beam shapers (e.g., OPAs). Notably, lithography processes can be used to direct the beam shapers 150 in desired directions that intersect with an atom path 115. That is, rather than using bulk optics, the location of the beam shapers 150 can be set so that the emitted optical signals 130 propagate in the desired directions and with a desired beam aspect ratio and divergence.

Although FIG. 1 illustrates emitting the optical signals 130 in a direction that is perpendicular or orthogonal to the edge surface 135, in some implementations the optical signals 130 may be emitted at different angles from the edge surface 135. Put differently, the optical signals 130 may be emitted from the edge surface 135 at other angles besides 90 degrees. In any case, in one embodiment, the optical signals 130 may be emitted in parallel directions during operation of the atomic sensor 100.

Moreover, the photonic die 105 may include any number of beam shapers 150. Different types of atomic sensors may use a different number of optical signals 130. The embodiments herein can be adapted for any type of atomic sensor that relies on directing optical signals 130 through a path of atoms.

After being emitted by the beam shapers 150, the optical signals 130 pass through respective lenses 155 that collimate the optical signals 130. For example, when emitted by the beam shapers 150, the optical signals 130 may have a strong divergence (e.g., a large numerical aperture (NA), which characterizes the range of angles over which the beam shapers 150 emit light). However, the lenses 155 can collimate the optical signals 130 before these signals pass through the atomic path 115. In the absence of the beam shapers 150, the optical signals may have to pass through multiple lenses in order to form the desired beam patterns, and to collimate the light. For example, to generate an extended elliptical beam pattern, fast axis lenses may be used. However, in some cases these lenses are very difficult to align and require sub-micron positioning precision to meet beam separation and parallelism tolerances. However, using the beam shapers 150 means these fast axis lenses can be omitted. Moreover, in other embodiments, the collimator lenses 155 can also be omitted, as shown for example in FIG. 9 below.

In one embodiment, an atomic source 110 can be disposed on a common substrate as the photonic die 105. The atomic source 110 is formed on a heater 140. In some examples, the atomic source 110 can include a reservoir of rubidium or cesium. The heater 140 in (or on) the substrate can heat the atomic source 110 so that the reservoir of rubidium or cesium emit a directed atomic beam along the atomic path 115. In one embodiment, the sensor 100 is in a vacuum.

FIG. 1 illustrates an atomic path 115 (i.e., the path at least some of the atoms emitted by the atomic source 110 take to form a directed atomic beam) that is approximately parallel to the edge surface 135. The atomic path 115 passes through a collimator 120 which collimates the atoms in the path 115. For example, the collimator 120 may include slits or holes that only permit the atoms traveling in a desired direction (i.e., the direction of the atomic path 115) to pass through.

The collimated atomic path 115 then passes through the optical signals 130 being emitted by the photonic die 105. The interaction between the optical signals 130 and the atoms in the path 115 will be discussed in more detail below. However, in one embodiment, the atoms interact with at least one of the optical signals 130 to cause the optical signal 130 to scatter. Put differently, depending on the state of the atoms when passing through an optical signal 130, the atoms may scatter the light of the optical signal 130. The intensity of the scattered light can be detected by a photodiode (PD) 145. The intensity of the light detected by the PD 145 can be correlated to a motion of the atomic sensor 100, such as rotation, acceleration, or both. For example, the atomic sensor 100 may be rigidly attached to a vehicle or a device where the motion of the sensor 100 can be used to detect a motion of the vehicle or the device.

While the embodiments below specifically describe an atomic sensor that can be used as a gyroscope, the arrangement illustrated in FIG. 1 is not limited to this type of sensor and may be used in other types of atomic (or molecule) sensors.

Figure 2:
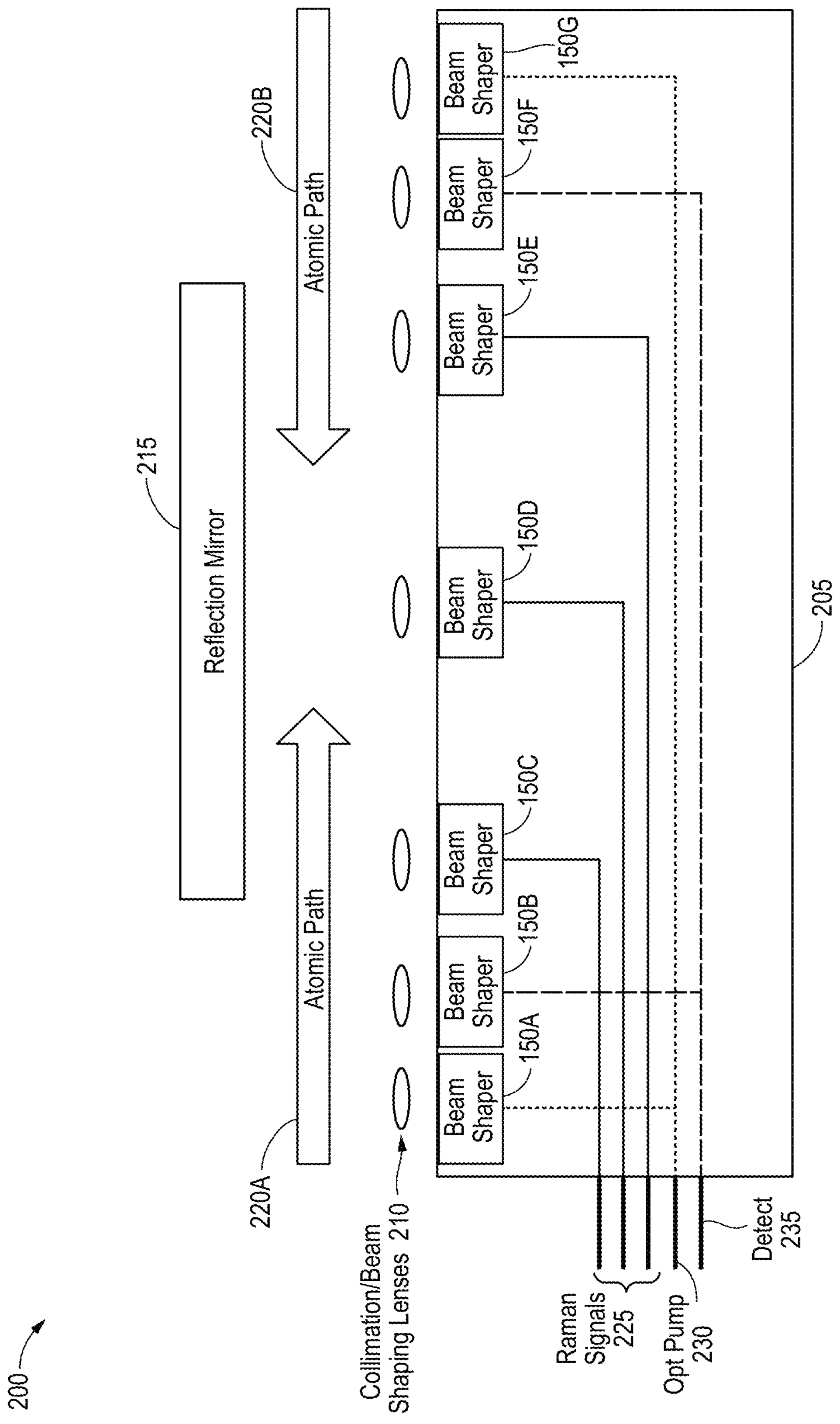
FIG. 2 illustrates an atomic sensor with a photonic die for outputting light at an edge surface, according to one embodiment described herein.

FIG. 2 illustrates an atomic sensor 200 with a photonic die 205 for outputting light at an edge surface, according to one embodiment described herein. Like above, as shown by this top view, the photonic die 205 includes a plurality of beam shapers 150A-G disposed at its edge. The sensor 200 includes collimation or beam shaping lenses 210 for focusing a respective one of the optical signals emitted by the beam shapers 150.

In this gyroscope example, the photonic die 205 is coupled to Raman optical signals 225, an optical pump 230, and a detection signal 235, where waveguides in the photonic die 205 route these optical signals to the beam shapers 150. While shown as being emitting in a direction orthogonal to the edge surface, the optical signals 130 may be emitted at other angles so long as the optical signals 130 intersect with the atomic paths 220.

As shown, the atom paths 220 intersect with optical signals emitted by the seven beam shapers 150A-G. These optical signals can have different purposes depending on the application. In one embodiment, some of the optical signals have different frequencies.

Assuming the atomic sensor 200 is used to form a gyroscope, the optical signals emitted by the beam shapers 150A and 150G can be state preparation signals that put the atoms released by the atomic sources in a desired state. These signals are labeled as optical (opt) pump 230 signals.

In this embodiment, the optical signal emitted by the beam shaper 150B is a detection signal 235 used to detect a change of state in the atoms in the atom path 220B traveling from right to left, while the optical signal emitted by the beam shaper 150F is a detection signal 235 used to detect a change of state in the atoms in the atom path 220A traveling to left to right. In one embodiment, the optical signal emitted by the beam shaper 150B has no, or very little effect, on the atoms traveling from left to right and the optical signal emitted by the beam shaper 150F has no or little effect on the atoms traveling from right to left. For example, the optical signal emitted by the beam shaper 150A can put the atoms traveling from left to right in a state that is unaffected by the optical signal emitted by the beam shaper 150B, and similarly the optical signal emitted by the beam shaper 150G can put the atoms traveling from right to left in a state that is unaffected by the optical signal emitted by the beam shaper 150F.

The optical signals emitted by the beam shapers 150C-E may perform Doppler sensitive two-photon Raman transitions on the atoms to make an atom interferometer sensitive to rotations and/or accelerations. If there is rotation and/or acceleration, the amount of light from the optical signals corresponding to beam shapers 150B and 150F that is scattered by the atoms changes. That is, after passing through the Raman optical signals 225 emitted by the beam shapers 150C-E, the atoms traveling from left to right may scatter the optical signal emitted by the beam shaper 150F. Similar, after the atoms traveling from right to left pass through the Raman optical signals 225 emitted by the beam shapers 150C-E, they can scatter the optical signal emitted by the beam shaper 150B. This scattering can be detected by one or more PDs.

While not shown, the PDs can be arranged such that when there is no scattering of the optical signals emitted by the beam shapers 150B and 150F, very little or no light is detected by the PDs. However, when motion leads the atoms to interact with optical signals emitted by the beam shapers 150B and 150F and scatter these signals, the PDs detect the light. For example, the PDs may be arranged so they are not in the beam path of the optical signals emitted by the beam shapers 150B and 150F so they detect light only when the atoms scatter these optical signals. A control system (not shown) can receive the electrical signal generated by the PDs and calculate a rotation and/or acceleration of the atomic sensor 200.

The atomic sensor 200 includes two atom paths 220 because this provides a differential way of measuring rotation. That is, the sign of the sensitivity to rotation is proportional to the velocity vector. The control system can take the difference (e.g., subtract) of the phase of the atom interference signals to extract the rotation. Thus, having two atom paths 220 may provide more accurate results than using one atom path/source; however, one atom path may be sufficient for some implementations.

Also, the atoms can be sensitive to acceleration. The acceleration is not dependent on the velocity direction, but the atoms traveling in opposite direction both detect the same acceleration and detect rotations in opposite signs so that by differencing the signals the controls system can separate the acceleration signal from the rotation signals. In this manner, the atomic sensor 200 can measure both rotation and acceleration.

Moreover, getters can be used to maintain a vacuum. For example, the atomic sensor 200 may be placed in a sealed vacuum environment. The getters can absorb the atoms emitted by the atomic sources so the volume does not fill with the atoms emitted by those sources and lose the vacuum. For example, the getters may be sintered porous getters or graphite getters. However, the getters can be any material that absorbs the atoms emitted by the atomic sources or residual gasses in the enclosure.

In one embodiment, a cross section of the atom paths 220 have dimensions of approximately 2 mm×1 mm. The optical signals emitted by the beam shapers 150A-B and 150F-G (e.g., the state preparation optical signals and the detection optical signals) have diameters of approximately 3 mm. The optical signals emitted by the beam shapers 150C-E (e.g., the Raman optical signals) have elliptical shapes with a major axis of approximately 4 mm and a minor axis of approximately 0.1 mm. In one embodiment, the elliptical beam patterns have an aspect ratio of at least 5:1. In other embodiments, the elliptical beam patterns have an aspect ratio of at least 10:1.

One non-limiting advantage of the atomic sensor 200 includes a reduction or elimination of hand aligned optics (since alignment may be taken care by lithography when fabricating the photonic die 205).

Figure 3:
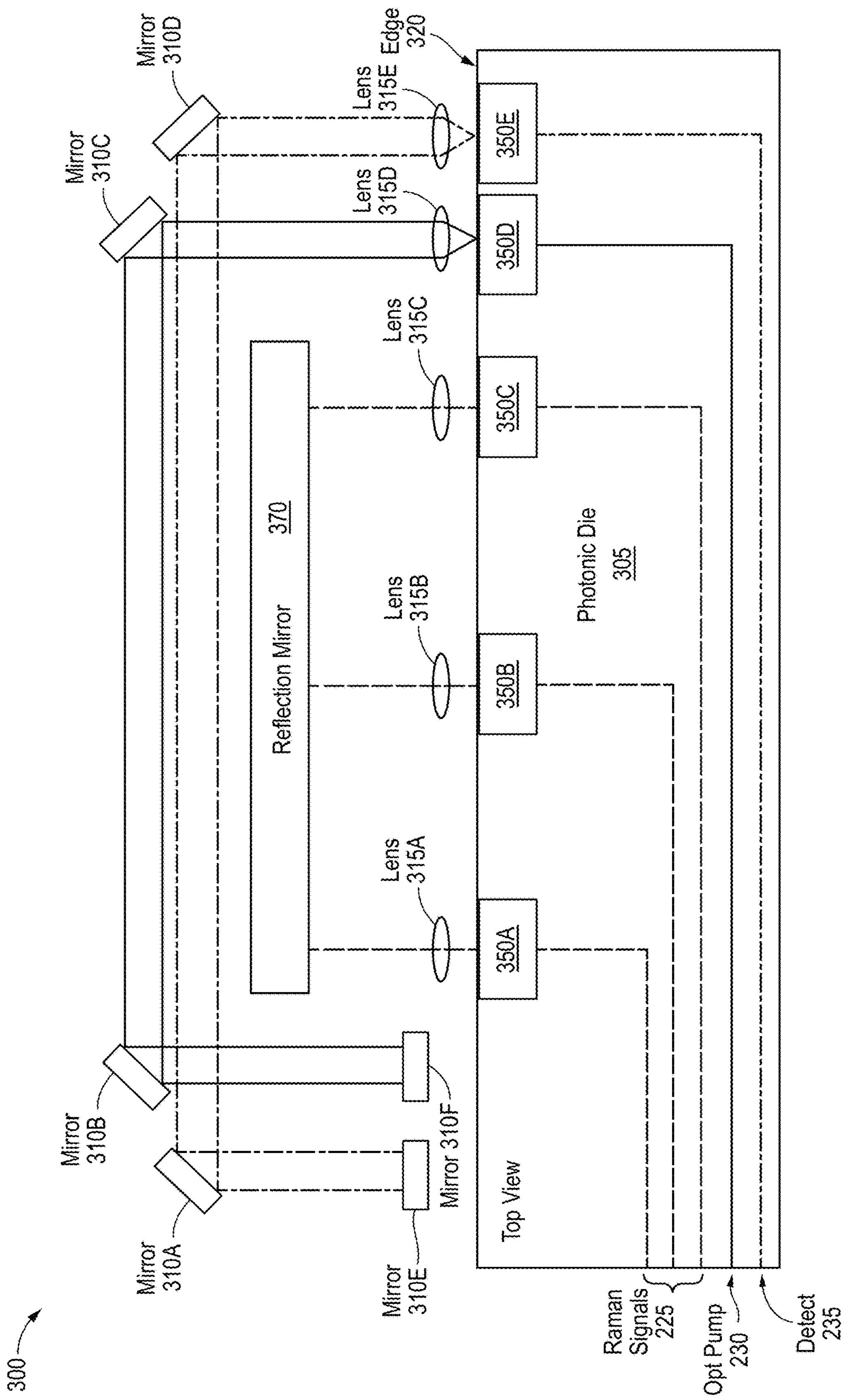
FIG. 3 illustrates an atomic sensor with a photonic die for outputting light at an edge surface, according to one embodiment described herein.

FIG. 3 illustrates an atomic sensor 300 with a photonic die 305 for outputting light at an edge surface 320, according to one embodiment described herein. As in FIG. 2, the photonic die 305 includes waveguides for routing the Raman signals 225, the optical pump 230, and the detection signal 235 to the edge surface 320. As shown, the photonic die 305 includes beam shapers 350A-E. The beam shapers 350 can be static beam shapers (e.g., adiabatic tapers) or adjustable beam shapers (e.g., OPAs). Notably, lithography processes can be used to direct the beam shapers 350 in a desired direction that intersects with an atom paths (e.g., the atom paths 220A and 220B illustrated in FIG. 2). That is, rather than using bulk optics, the location of the beam shapers 350 in the die 305 can be set so that the emitted optical signals propagate in the desired directions and with a desired beam pattern.

In this example, the Raman signals 225 emitted by the beam shapers 350A-C pass through the atom paths and then are reflected by a retroreflection mirror 370. This mirror 370 reflects the Raman signals 225 in a direction back towards the beam shapers 350A-C (i.e., in the reverse direction). This retroreflection can be used to align lenses 315A-315C which collimate the Raman signals 225, as discussed below.

The beam shaper 350D emits the optical pump 230 while the beam shaper 350E emits the detection signal 235. However, the beam shapers 350D and 350E can be optional since the optical pump 230 and the detection signal 235 may not need to have elliptical beam patterns; however it can still be advantageous to include beam shapers 350D and 350E since they can be used in alignment or diagnostics. In any case, the optical pump 230 and the detection signal 235 are reflected using the mirrors 310A-D so that these signals each pass through the atom paths twice—once on each side of the retroreflection mirror 370. The optical pump 230 and the detection 235 are then retro reflected by mirrors 310E and 310F, respectively.

Advantageously, the divergence angles of the optical signals in and out of plane of the beam shapers 350 can be tailored to desired specifications to omit independent fast and slow axis collimators for the Raman signals 225. Moreover, this design replaces hard to align fast axis lens with a single longer focal length collimators (e.g., the lenses 315A-C). For example, prior designs that do not have the beams shapers 350 can require sub 100 nm positioning precision on the fast axis lens to meet beam separation and parallelism tolerances.

Moreover, if the beams shapers 350 are implemented using OPAs, the beam shapers 350 can be beam steered (or adjusted) after assembly which can reduce alignment requirements even further, allows for post-build optimization, and improves alignment of the optical signals with the atom paths. In addition, the beam shapers 150 can provide a larger NA, which means the overall size of the sensor 300 can be reduced. For example, a larger NA means all the components above the photonic die 305 may be moved closer to the edge 320 of the die 305 which means the size of the atomic sensor 300 in the Y direction can be reduced.

Figure 4:
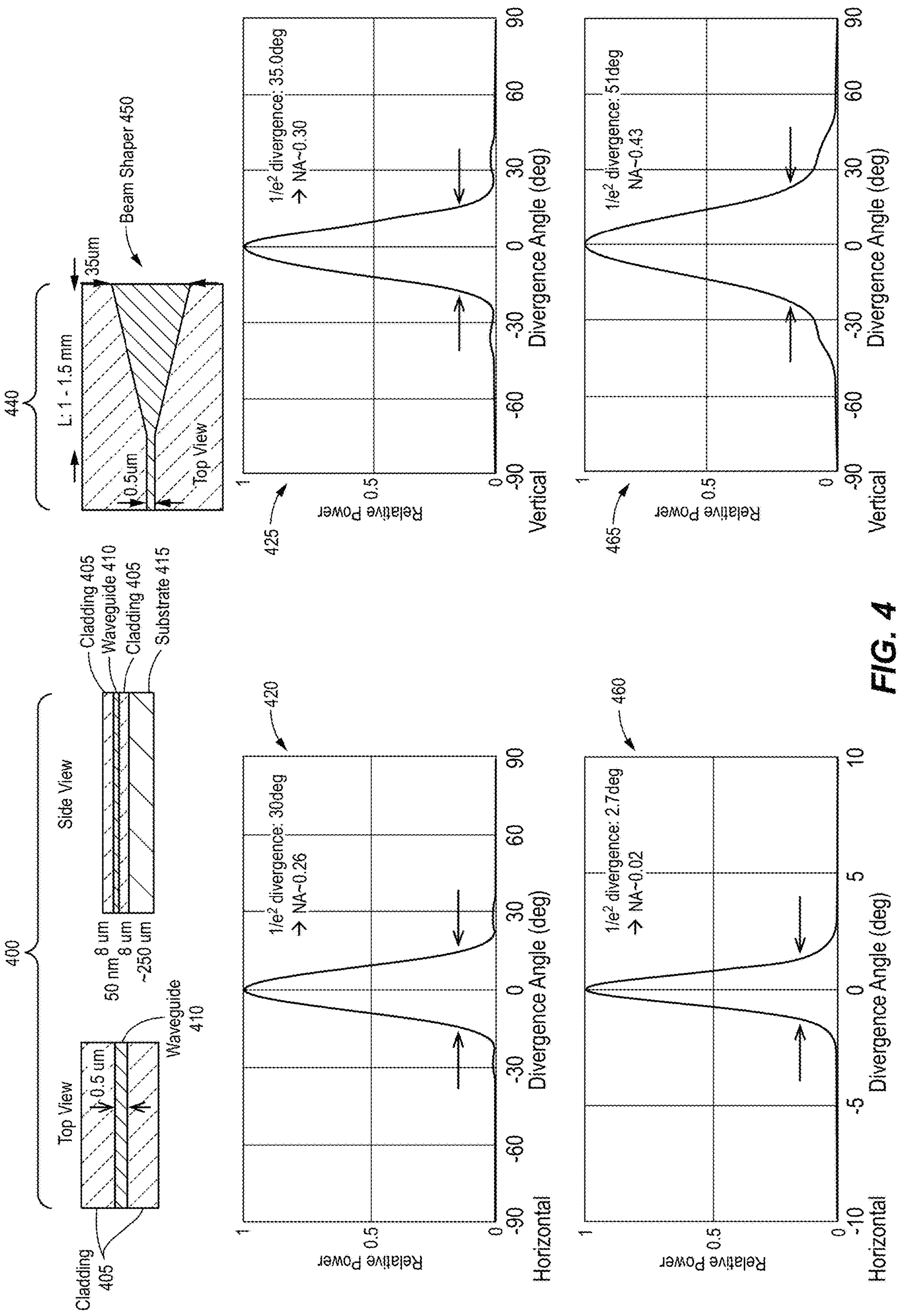
FIG. 4 illustrates optical interfaces for different types of beams in an atomic sensor, according to one embodiment described herein.

FIG. 4 illustrates optical interfaces for different types of beams in an atomic sensor, according to one embodiment described herein. The left side of FIG. 4 provides top and side views of an optical interface 400 that lacks a beam shaper (e.g., the beam shapers 150 or 350 discussed above). The optical interface 400 can be the edge of a photonic die, such as one used in the sensors discussed above.

The side and top views of the optical interface 400 include cladding 405 and a waveguide 410 disposed on a substrate 415. In this example, the height and width dimensions of the waveguide 410 do not substantially change as the waveguide 410 approaches the edge of the optical interface 400.

The chart 420 illustrates the horizontal divergence of the optical signal emitted from the waveguide 410 at the edge of the optical interface 400. In this case, the waveguide 410 has a height of 50 nm and width of 0.5 microns which results in a divergence of approximately 30 degrees and a NA of approximately 0.26.

The chart 425 illustrates the vertical divergence of the optical signal emitted from the waveguide 410 at the edge of the optical interface 400. In this case, the waveguide 410 has a vertical divergence of approximately 35 degrees and a NA of approximately 0.3. Thus, the divergence and NA of the waveguide is similar in both the vertical and horizontal directions. As such, the optical signal emitted by the waveguide has a substantially circular beam pattern, which may be preferred for the optical pumping and detection beams. However, as discussed above, it is desirable in atomic sensors for some of the emitted optical signals to have more elliptical beam patterns, which is the reason that prior sensors include fast axis lenses. These desired beam patterns can be achieved by using the static beam shaper 450 shown in the optical interface 440 on the right side of FIG. 4.

The side view of the optical interface 440 may be similar as the side view of the optical interface 400, where a height or thickness of the waveguide 410 does not change. However, the top view of the optical interface 440 illustrates that a width of the waveguide flares (or tapers, depending on the direction) to form the beam shaper 450. In one embodiment, the flare or taper of the beam shaper 450 is a smooth, adiabatic taper so the optical mode of the signal remains a single spatial mode (e.g., the fundamental mode) to avoid multimode behavior.

In this example, the beam shaper 450 is a static beam shaper since it cannot be beam steered or adjusted dynamically. The dimensions of the beam shaper 450 (as well as the cladding 405 and substrate 415) can vary depending on the application, such as what type of atom is being used. For example, a 780 nm optical signal is used as the Raman signals when Rb is the atomic element. In that case, the dimensions of the beam shaper 450 can be as shown where it has a length (L) of 1 to 1.5 mm and tapers from a width of 35 microns to 0.5 microns. However, if Cs is the atomic source, then 850 nm Raman signals are used and the dimensions of the beam shaper 450, as well as the cladding 405 and substrate 415 can also change.

The chart 460 illustrates the horizontal divergence of the optical signal emitted from the beam shaper 450 at the edge of the optical interface 440. In this case, the dimensions of the taper of the beam shaper 450 results in a divergence of approximately 2.7 degrees and a NA of approximately 0.02, which means it has a much smaller divergence and NA in the horizontal plane than the waveguide 410 of the optical interface 400.

The chart 465 illustrates the vertical divergence of the optical signal emitted from the beam shaper 450. In this case, the beam shaper 450 has vertical a divergence of approximately 51 degrees and a NA of approximately 0.43 which means it has a much larger divergence and NA in the vertical plane than the waveguide 410 of the optical interface 400. Further, because of the different divergence/NA in the vertical and horizontal planes, the signal or beam emitted by the beam shaper 450 has a more elliptical beam pattern, which means fast axis lenses are not needed.

For state preparation and detection optical signals, these beams may be symmetric (e.g., have circular rather than elliptical beam patterns). In that case, the optical interface 400 could be used, with a NA of approximately 0.3. The NA is still engineered to be quite high compared to optical fiber, for example, which means a shorter focal lens can be used to get the same beam diameter, making the device width smaller. However, it may be useful to still use an OPA at these optical interfaces since this enables the beams to be steered with can help with alignment or to perform other ancillary features in the sensor. But for Raman signals, the beam shapers 450 can be used.

Figure 5:
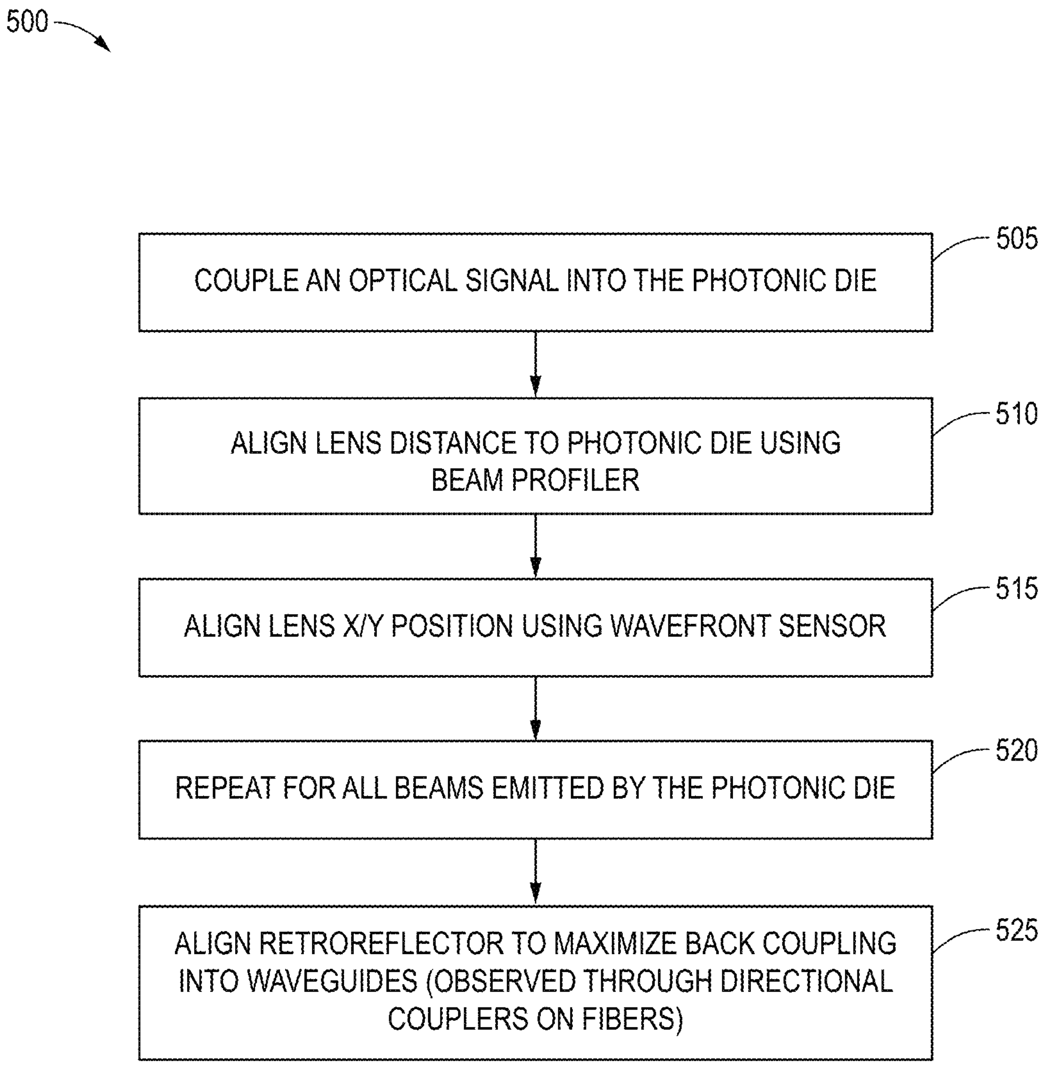
FIG. 5 is a flowchart for aligning a beam shaper on a photonic die, according to one embodiment described herein.

FIG. 5 is a flowchart of a method 500 for aligning a beam shaper on a photonic die, according to one embodiment described herein. At block 505, an optical signal is coupled into a waveguide of the photonic die, which results in the optical signal being emitted from at least one of the beam shapers disposed at edge of the die. While it may be easier to manufacture integrated beam shapers at an edge (side) of a die, beam shapers can also be integrated into a top side (or bottom side) of a die. Thus, the embodiments herein are not limited to disposing beam shapers at an edge or side of a photonic die.

At block 510, a beam profiler is used to set the distance between the photonic die and the lens. The beam profiler can receive the optical signals emitted by the photonic die and provide an output that a technician can use to move the lens closer to, or farther away from, the beam shaper.

At block 515, a wavefront sensor is used to align the lens in the x/y position (e.g., on a plane that is parallel to the edge or surface of the photonic die that emits the optical signal).

At block 520, blocks 505-515 are repeated for each beam (or optical signal) emitted by the photonic die. This can include the Raman signals, state preparation signals, and detection signals.

At block 525, the retroflection mirror is aligned to maximize back coupling into waveguides. That is, the mirror is aligned so the Raman signals are reflected back into the photonic die. In one embodiment, the retroreflection is observed by using directional couplers on the fibers that provide the Raman signals to the photonic die.

As one non-limiting example, the method 500 can be used to align lenses to the detection and pump optical signals that have approximately 5 mm focal length that are disposed 5 mm from the photonic die. For the Raman signals, the lenses may have approximately 3.3 mm focal lengths and may be disposed approximately 3.3 mm from the photonic die. Again, these focal lengths and distances can vary depending on the implementation (e.g., the type of atomic source used).

Figure 6:
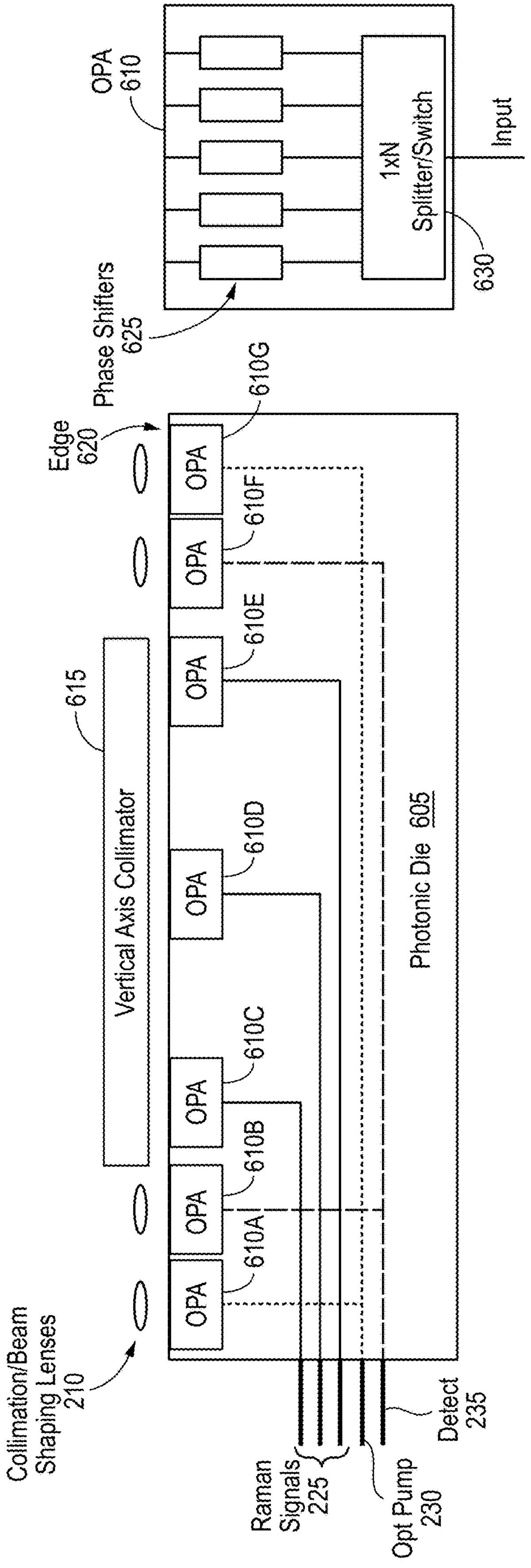
FIG. 6 illustrates an atomic sensor with a photonic die for outputting light at an edge surface using optical phased arrays, according to one embodiment described herein.

FIG. 6 illustrates an atomic sensor 600 with a photonic die 605 for outputting light at an edge surface 620 using OPAs 610A-E, according to one embodiment described herein. That is, the OPAs 610 are one implementation of the beam shapers discussed above. The OPAs 610 provide more freedom on various aspect ratios than the static beam shapers illustrated in FIG. 4. For example, the OPA 610 can adjust the number of channels, spacing between elements, width of each element, and the like. In addition, the OPAs 610 inherently support single mode operation.

Moreover, FIG. 6 illustrates a vertical axis collimator 615 that can be used to collimate the Raman signals 225 received from the OPAs 610C-E. In this case, a cylindrical lens can be used to collimate in the vertical direction for the Raman signals 225 while there is a naturally low diverging beam in the horizontal direction. That is, because the divergences in the horizontal direction is small, one large lens (e.g., the vertical axis collimator 615) can be used to collimate in the vertical direction rather than using individual lenses.

The right side of FIG. 6 illustrates an exemplary OPA 610, which includes phase shifters 625 and a switch 630 (or a splitter). Advantageously, the phase shifters 625 allow for tuning the beam pointing direction in-plane, which can be used post assembly to parallelize the beams emitted by multiple OPAs 610. Further, the switch 630 can be a configurable switch used for in-situ beam shaping to dynamically change the number of channels, dynamically sweep the beam, or change an aspect ratio of the beam. In addition, the OPAs 610A, B, F, and C permit the user to change the direction of the pump 230 and detection signals 235. This could be used to identify and monitor, for example, the velocity distribution of the atom paths. Changing the direction of the beams can also be used to gather diagnostic measurements since changing direction can make the light interact with the atoms in different ways (e.g., to determine a health of the atomic source, direction, velocity, etc.). Moreover, the OPAs 610 could be controlled to sweep the optical signals.

In one embodiment, the phase shifters 625 can be implemented using, acousto-optic modulators, thermo-optic modulators (heaters), or electro-optic modulators.

Figure 7:
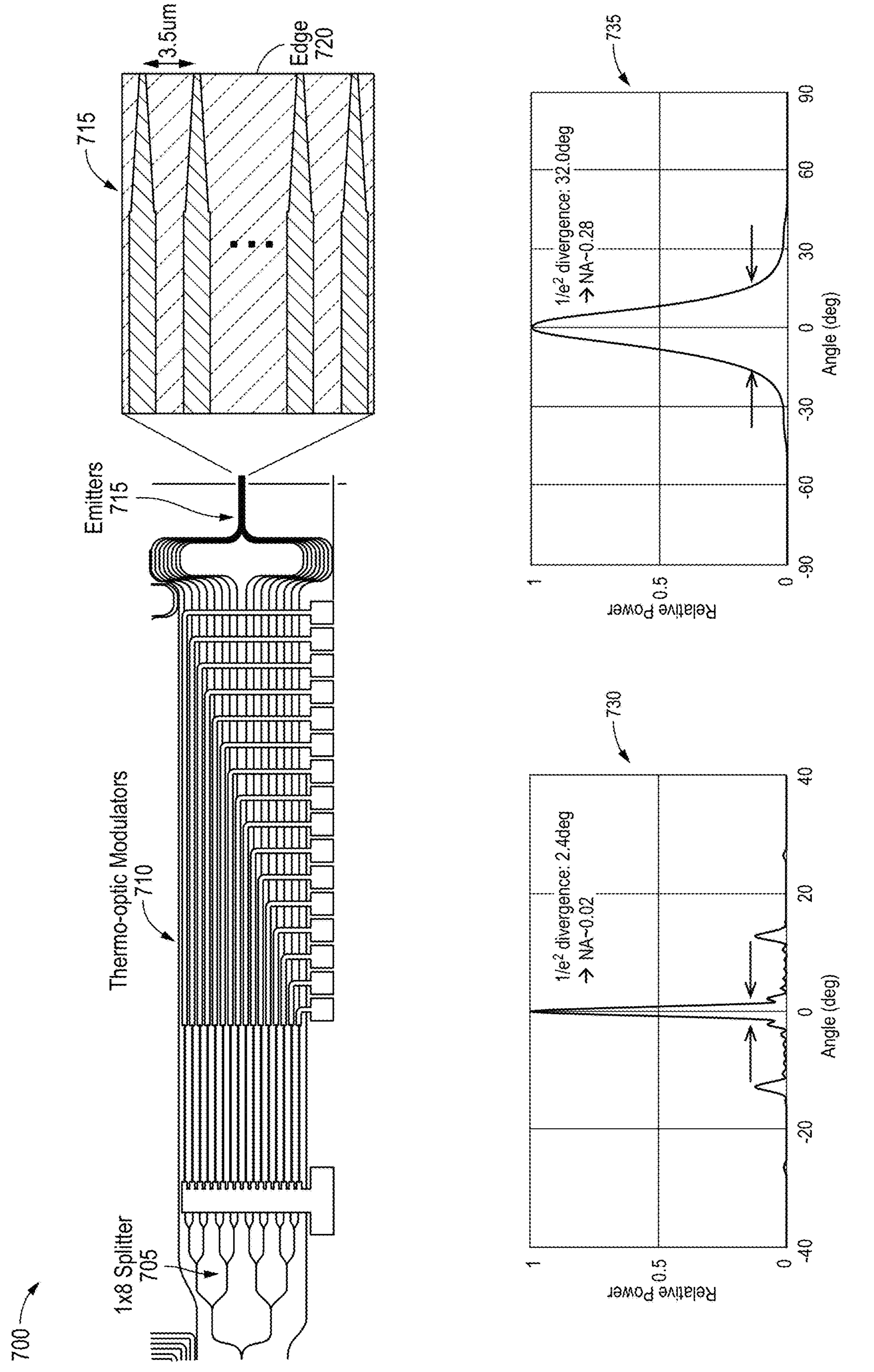
FIG. 7 illustrates an optical phased array, according to one embodiment described herein.

FIG. 7 illustrates an OPA 700, according to one embodiment described herein. This OPA 700 includes a 1×8 splitter 705 which splits an input optical signal (e.g., any of the optical signals shown in FIG. 2, 3, or 6) into 8 channels. Each channel includes a thermo-optic modulator 710 (e.g., one example of a phase shifter). The output of the thermo-optic modulators 710 are connected to emitters 715 which transmit the optical signals. The phase of the optical signals is set so that, when combined, the output beam pattern has a desired shape (e.g., an ellipse as discussed above). Moreover, the thermo-optic modulators 710 can be used to change or adjust the direction of the optical signal generated by the thermo-optic modulators 710.

The right side of FIG. 7 illustrates a detailed top view of the emitters 715. In this example, the width of the emitters 715 tapers as the emitters 715 approach the edge surface 720 of the photonic die. For example, the width of the emitters before the taper may be approximately 0.5 microns but then taper to 0.25 microns at the edge surface 720. However, this can vary depending on the implementation.

Moreover, in one embodiment, the pitch between two emitters is approximately 3.5 microns, but again, this can vary.

The chart 730 illustrates the horizontal divergence of the optical signal emitted from the OPA 700 at the edge surface 720. In this case, the OPA 700 outputs a combined optical signal with a horizontal divergence of approximately 2.4 degrees and a NA of approximately 0.02.

The chart 735 illustrates the vertical divergence of the optical signal emitted from the OPA 700 at the edge surface 720. In this case, the OPA 700 outputs a combined optical signal with a vertical divergence of approximately 32 degrees and a NA of approximately 0.28. As such, the optical signal of the OPA 700 has an elliptical beam pattern, like the beam shaper 450 in FIG. 4. However, rather than being static, the OPA 700 can be adjusted for any number of reasons, such as to parallelize optical signals, implement different aspect ratios, changing directions, further change the beam pattern, and the like.

Figure 8:
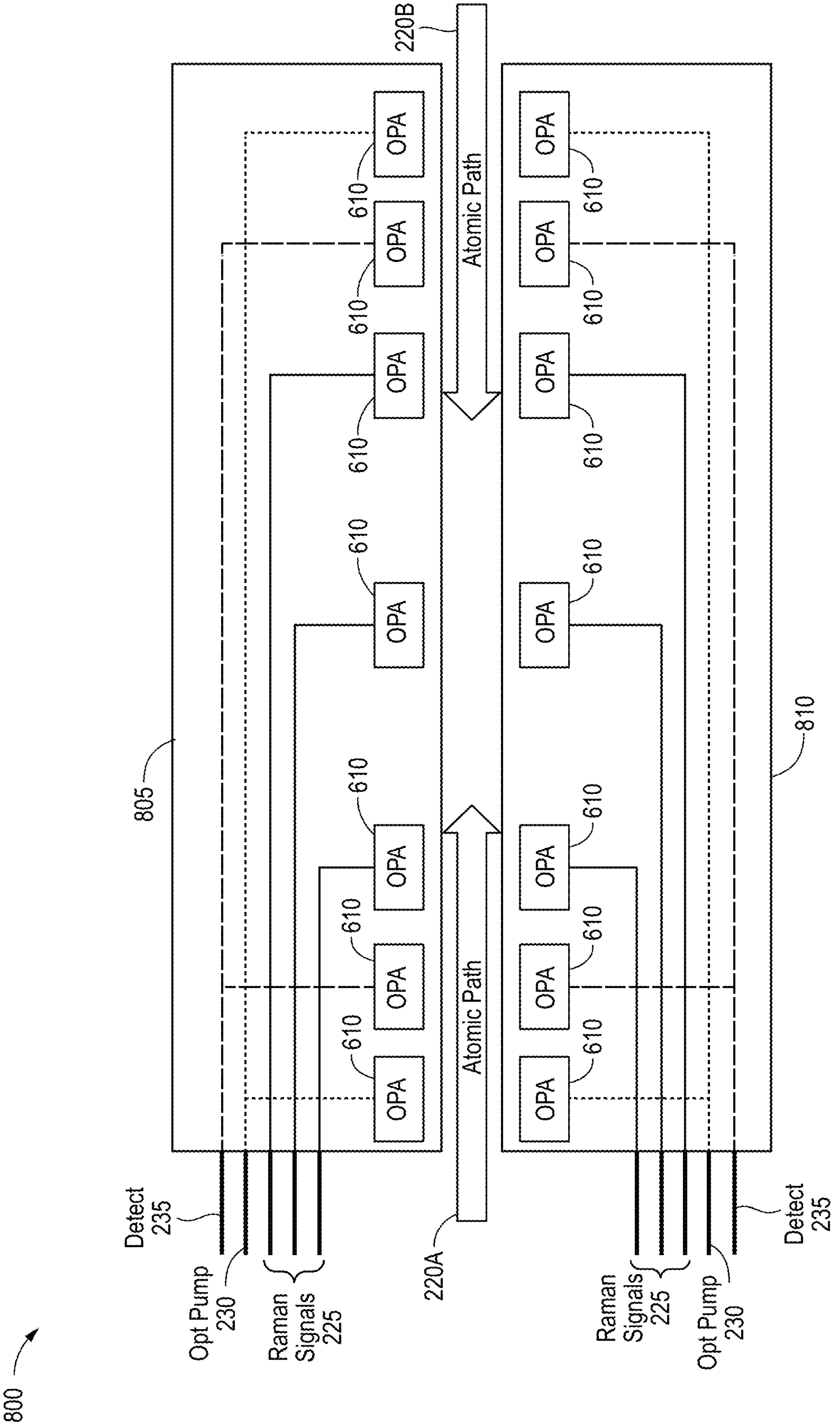
FIG. 8 illustrates an atomic sensor with two photonic dies for outputting light at an edge surface, according to one embodiment described herein.

FIG. 8 illustrates an atomic sensor 800 with two photonic dies for outputting light at an edge surface, according to one embodiment described herein. Notably, the atomic sensor 800 can be implemented without using any lenses (although in some implementations collimating lenses can be used).

In this example, the photonic dies 805 and 810 have the same components, which were described above. Moreover, the dies 805, 810 are aligned so that the same optical signal is exchanged between the dies, after these signals pass through the atom paths 220. That is, the detection signals emitted by the die 805 are received at the same waveguides in the die 810 that emit the detection signals, and similarly for the Raman and state preparation signals.

The two photonic dies can be brought into sufficient proximity that the optical signals can be exchanged without having to first collimate the optical using lenses. In this manner, the OPAs 610 in the two dies can exchange optical signals in free space without the use of lenses. Moreover, because two dies are used, the retroflection mirror can also be omitted. Omitting these elements can mean the photonic dies (which are typically smaller than the lenses) can be disposed closer to each other, which may reduce package width of the sensor 800.

In addition, the two-die arrangement in FIG. 8 can allow for individual control of laser frequencies propagating in opposite directions. That is, the detection, Raman, preparation signals emitted by one die may be at different frequencies than the detection, Raman, preparation signals emitted by the other die. This enables separating Doppler free Raman transitions from Doppler sensitive Raman transitions. Moreover, Stimulated Raman Adiabatic Passage (STIRAP) for optical pumping beams using diverging beams (in the horizontal direction) can be performed.

Further, in the one-die embodiments shown in FIGS. 2, 3, and 4, the atom paths 220 may be titled relative to each other (rather than traveling in exactly opposite directions as shown) to help distinguish between Doppler free Raman transitions and Doppler sensitive Raman transitions. However, in the two-die embodiment in FIG. 8 different frequencies can be used so the atom paths 220 do not have to be tilted (i.e., can travel in opposite directions).

Figure 9:
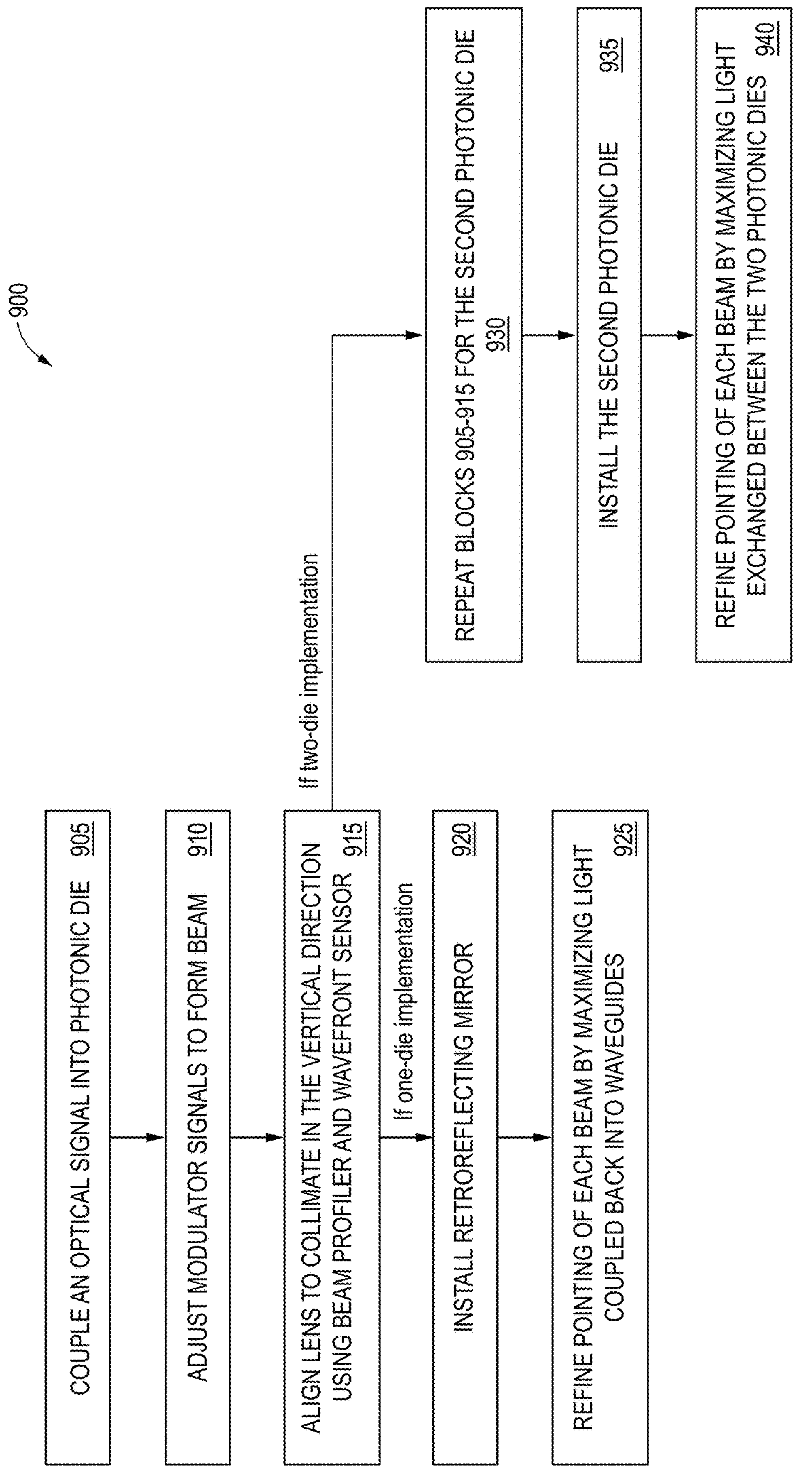
FIG. 9 is a flowchart for aligning an optical phased array on one or more photonic dies, according to one embodiment described herein.

FIG. 9 is a flowchart of a method 900 for aligning an OPA on one or more photonic dies, according to one embodiment described herein. At block 905, an optical signal is coupled into a waveguide of the photonic die, which results in the optical signal being emitted through at least one of the OPAs disposed at edge of the die. While it may be easier to manufacture integrated OPAs at an edge (side) of a die, OPAs can also be integrated into a top side (or bottom side) of a die. Thus, the embodiments herein are not limited to disposing OPAs at an edge or side of a photonic die.

At block 910, the modulator signals for the phase shifters in the OPAs are adjusted to form the desired beam patterns or forms. For example, the initial values of the phase shifters may be off due to fabrication errors when forming the photonic die. The output beam of the OPAs can be observed with a beam profiler, and then the modulator signals can be adjusted, until the desired beam pattern or form is achieved. For example, a camera with a hole can be used to optimize the power, and then a beam profiler can be used to achieve the desired shape.

At block 915, lenses are aligned to collimate the optical signals emitted by the OPAs in the vertical direction. This alignment can be controlled using a beam profiler and a wavefront sensor.

If the sensor has only one-die (such as the examples shown in FIGS. 2, 3, and 6), the method 900 proceeds to block 920 where the retroreflecting mirror is installed.

At block 925, the light being coupled back into the OPAs from the retroreflecting mirror is maximized using, for example, direction couplers on the fiber input. In this case, the direction of the light can be adjusted using the OPAs to maximize the back reflected light, or the retroflecting mirror can be moved.

However, if the sensor includes two-dies (such as the example shown in FIG. 8), the method 900 instead proceeds to block 930 where blocks 905-915 are repeated for the second photonic die.

At block 935, the second photonic die is installed such that its surface that contains the OPAs is in a facing relationship with the surface of the first photonic dies that includes its OPAs. In one embodiment, extra pilot waveguides can be used to align the two photonic dies to each other (or use switches on OPAs to make a single waveguide beam). Block 935 can provide a coarse or rough alignment between the OPAs in the two photonic dies.

At block 940, the OPAs can be adjusted (e.g., changing the direction of the beams), or the relative position of the dies can be adjusted, to maximize the light exchanged between the two photonic dies. This can be observed by using, e.g., direction couplers on the fiber input. This can be a fine alignment between the OPAs in the two dies.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An atomic sensor, comprising:

one or more atomic sources configured to emit a directed atomic beam along a path in the atomic sensor; and one or more photonic dies comprising a plurality of beam shapers disposed along an edge surface of the photonic die that is orthogonal to a top surface of the photonic die, wherein the plurality of beam shapers is configured to emit a plurality of optical signals from the edge surface with desired beam aspect ratios and divergences that pass through the path.

2. The atomic sensor of claim 1, wherein at least one of the beam shapers comprises a waveguide with an adiabatic taper to create elliptical beam patterns for the plurality of optical signals, wherein the elliptical beam patterns have an aspect ratio of at least 5:1.

3. The atomic sensor of claim 2, wherein a width of the waveguide changes in the adiabatic taper but a height of the waveguide does not change in the adiabatic taper.

4. The atomic sensor of claim 1, wherein at least one of the beam shapers comprises an optical phased array (OPA) to create elliptical beam patterns for the plurality of optical signals, wherein the elliptical beam patterns have an aspect ratio of at least 5:1.

5. The atomic sensor of claim 4, wherein the OPA comprises an optical splitter or switch, a plurality of phase shifters coupled to an output of the optical splitter or switch, and a plurality of emitters coupled to outputs of the plurality of phase shifters.

6. The atomic sensor of claim 5, wherein the switch is a configurable switch configured to dynamically sweep a beam or change an aspect ratio of the beam.

7. The atomic sensor of claim 5, wherein the plurality of phase shifters comprises acousto-optic, thermo-optic or electro-optic modulators.

8. The atomic sensor of claim 5, wherein the plurality of emitters taper at an edge of the photonic die.

9. The atomic sensor of claim 1, further comprising:

a retroflection mirror configured to reflect signals emitted by the plurality of beam shapers back into the plurality of beam shapers.

10. The atomic sensor of claim 9, further comprising:

collimating lenses optically aligned between the plurality of beam shapers and the retroflection mirror.

11. The atomic sensor of claim 1, further comprising:

a second photonic die comprising a second plurality of beam shapers disposed within the second photonic die, wherein the second plurality of beam shapers is configured to emit a second plurality of optical signals with elliptical beam patterns, wherein the second photonic die and the photonic die are aligned such that the second plurality of beam shapers exchanges the plurality of optical signals and the second plurality of optical signals with the plurality of beam shapers, wherein the path extends between the photonic die and the second photonic die.

12. The atomic sensor of claim 11, wherein there are no lenses in optical paths between the second plurality of beam shapers in the second photonic die and the plurality of beam shapers in the photonic die.

13. The atomic sensor of claim 1, further comprising:

a second atomic source configured to emit atoms along a second path in the atomic sensor that is a different direction than the path, wherein the plurality of optical signals pass through the second path.

14. The atomic sensor of claim 1, wherein the plurality of beam shapers is configured to emit the plurality of optical signals on a same edge surface of the photonic die.

15. The atomic sensor of claim 1, further comprising:

a photodiode arranged to detect scattering of a first optical signal of the plurality of optical signals due to the atoms traveling through the first optical signal.

16. The atomic sensor of claim 1, wherein the one or more photonic dies comprises waveguides connected to the plurality of beam shapers, wherein the plurality of optical signals propagates in the waveguides in a direction that is parallel to a direction the plurality of optical signals is emitted by the plurality of beam shapers.

* * * * *